(12) United States Patent
Fu (10) Patent No.: US 9,979,291 B2
(45) Date of Patent: May 22, 2018

(54) INVERTER APPARATUS

(71) Applicant: Futurewei Technologies, Inc., Plano, TX (US)

(72) Inventor: Dianbo Fu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days. days.

(21) Appl. No.: 15/335,339

(22) Filed: Oct. 26, 2016

(65) Prior Publication Data

US 2018/0115243 A1   Apr. 26, 2018

(51) Int. Cl.
*H02M 7/68* (2006.01)
*H02M 3/158* (2006.01)
*H02M 7/537* (2006.01)
*H02M 1/32* (2007.01)

(52) U.S. Cl.
CPC ............. *H02M 3/158* (2013.01); *H02M 1/32* (2013.01); *H02M 7/537* (2013.01)

(58) Field of Classification Search
CPC .. H02J 7/0065; H02J 3/32; H02M 2001/0022; H02M 3/1582; H02M 7/68; H02H 7/1213; H03K 17/063
USPC ................ 323/222, 224, 266, 271, 282–287; 363/16–17, 34, 37, 124, 127, 271, 98; 307/11, 45, 64, 66, 100
See application file for complete search history.

(56) References Cited

U.S. PATENT DOCUMENTS

| | | | | |
|---|---|---|---|---|
| 5,161,097 A * | 11/1992 | Ikeda | ..................... | G05F 1/563 323/222 |
| 6,906,933 B2 * | 6/2005 | Taimela | .................... | H02J 3/32 363/34 |
| 7,920,393 B2 * | 4/2011 | Bendre | .................. | H02M 7/487 363/127 |
| 8,294,306 B2 * | 10/2012 | Kumar | .................. | H02J 3/1842 307/140 |
| 8,441,820 B2 * | 5/2013 | Shen | ..................... | H02M 7/487 363/131 |
| 2012/0218785 A1 * | 8/2012 | Li | ............................ | H02M 1/34 363/21.12 |
| 2013/0272045 A1 * | 10/2013 | Soeiro | ................... | H02M 7/537 363/131 |

OTHER PUBLICATIONS

Choudhury, A. et al., "DC-Bus voltage balancing algorithm for three-level neutral-point-clamped (NPC) traction inverter drive with modified virtual space vector," IEEE Transactions on Industry Applications 52(5)3958-3967 (2016).

* cited by examiner

*Primary Examiner* — Rajnikant Patel
(74) *Attorney, Agent, or Firm* — Futurewei Technologies, Inc.

(57) ABSTRACT

An inverter apparatus is provided for converting direct current to alternating current. The inverter apparatus includes a boost converter coupled between a power source and a bypass circuit, and a power inverter coupled between the bypass circuit and a load to generate an output voltage. The output voltage is powered by the power source directly via the bypass circuit without activating the boost converter when the output voltage is smaller than a threshold voltage. The output voltage is powered by the power source boosted by the boost converter when the output voltage is larger than the threshold voltage. High efficiency is achieved by bypassed the boost converter.

20 Claims, 9 Drawing Sheets

INVERTER APPARATUS

FIELD OF THE INVENTION

The present invention relates to the field of electronics, and more particularly to an inverter apparatus.

BACKGROUND

Inverters are circuits for converting a direct current (DC) to an alternating current (AC). That is, an inverter converts direct current electric energy from a source, such as a battery, to an alternating current, which is generally a sine wave or square wave. One particular type of inverter is a multi-level inverter that is configured to first convert a direct current into a step-like square wave of multiple levels, and then form a sine wave by using a filter. If there are more levels implemented by the multi-level inverter, a waveform of a sine wave that is obtained by the multi-level inverter is more approximate to a standard sine waveform.

In terms of topology varieties, multi-level inverters take many forms, such as diode-clamped multi-level inverters, flying capacitor multi-level inverters, and others (e.g. cascaded H-bridge multi-level inverters, etc.). Unlike flying capacitor multi-level inverters which typically employ capacitors for clamping purposes, diode-clamped multi-level inverters use diodes to provide multiple voltage levels through different phases to capacitor banks. In use, the diode transfers a limited amount of voltage, thereby reducing the stress on other electrical components.

SUMMARY

This specification describes an inverter apparatus/method to increase high efficiency in an inverter system.

Certain aspects of the subject matter described here can be implemented by an inverter apparatus for converting direct current to alternating current. The inverter apparatus can include a boost converter coupled between a power source and a bypass circuit, and a power inverter coupled between the bypass circuit and a load. The power converter can generate an output voltage. According to one embodiment, the output voltage can be powered by the power source directly via the bypass circuit without activating the boost converter when the output voltage is smaller than a first threshold voltage. The output voltage can be powered by the power source boosted by the boost converter when the output voltage is larger than a second threshold voltage no less than the first threshold voltage. In some embodiments, the first threshold voltage may correspond to a half of an input source voltage of the power source.

In another embodiment, an inverter apparatus includes a boost converter coupled between a power source and a bypass circuit, and a power inverter coupled between the bypass circuit and a load. When a half of an input source voltage of the power source is larger than an output voltage, an input voltage of the power inverter comes from the power source via the bypass circuit by bypassing the boost converter, and when the half of the input source voltage is less than the output voltage, the input voltage of the power inverter comes from the boost converter.

The bypass circuit includes two switches. The bypass circuit can be configured as part of the power inverter or as a circuit element separate from the power inverter. When a half of an input source voltage of the power source is larger than the output voltage, a switch of the bypass circuit is performing pulse-width modulation (PWM), and another switch of the bypass circuit is turned off. When a half of an input source voltage of the power source is less than the output voltage, a switch of the bypass circuit is turned on, and another switch of the bypass circuit is turned off.

The power inverter includes two switches. When a half of an input source voltage of the power source is larger than the output voltage, the two switches of the power inverter are turned off.

Certain aspects of the subject matter described here can be implemented as a method for operating an inverter apparatus, wherein the apparatus comprises a boost converter coupled between a power source and a bypass circuit, and a power inverter coupled between the bypass circuit and a load, and wherein the boost converter comprising two switches. When an output voltage is less than a voltage threshold, the boost converter and the bypass circuit are controlled to power an output voltage directly from the power source via the bypass circuit without activating the boost converter when the output voltage is less than a voltage threshold, and wherein the two switches of the boost converter are switched off to deactivate the boost converter.

Because less power is processed by the boost converter, potential power loss and associated cost could be reduced. As a result, high efficiency is achieved by bypassing the boost converter.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Various embodiments are disclosed herein at least some of which address one or more of the challenges with multilevel inverters and/or possibly other inverters, as well. It should be noted that the following information is set forth for illustrative purposes and should not be construed as limiting in any manner. Any of the following features may be optionally incorporated with or without the exclusion of other features described.

Figure 1:
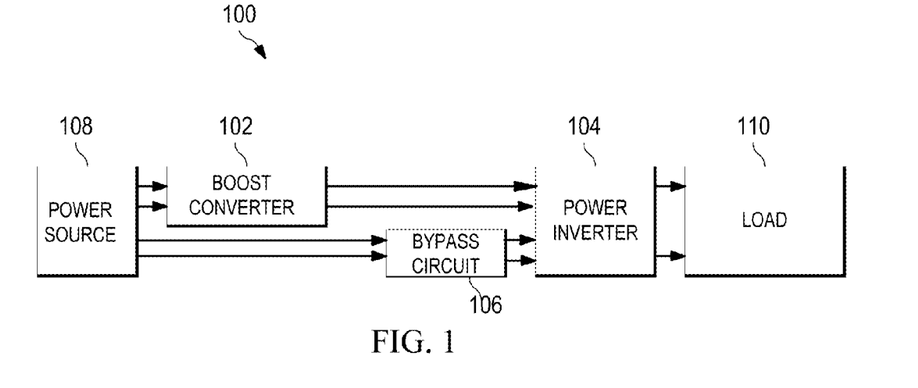
FIG. 1 illustrates a block diagram of an inverter apparatus for converting direct current to alternating current, in accordance with an embodiment.

FIG. 1 illustrates a block diagram of an inverter apparatus (or circuit) 100 for converting direct current (DC) to alternating current (AC), in accordance with one embodiment. As shown, the inverter apparatus 100 includes a boost converter 102 and a power inverter 104. The inverter apparatus 100 uses the boost converter 102 to produce a higher-voltage DC and then uses the power inverter 104 to convert direct current (DC) to alternating current (AC) for producing household plug-in voltage from a lower-voltage DC source. More illustrative information will now be set forth regarding various optional topologies and uses by which the foregoing features may or may not be realized, per the desires of the designer, in accordance with different embodiments.

The boost converter 102 can be configured for electrical communication with a power source 108 which may, in one embodiment, take the form of a direct current battery. In other embodiments, the power source 108 may take absolutely any desired form including, but not limited to a fuel cell, generator, solar panel, etc. Further, the term "electrical communication", "electrically coupled", "coupled with", and "coupled to" in the context of the present description may refer to any direct and/or indirect electrical coupling between relevant electric components. For instance, such electric components may be in electrical communication with or without intermediate components there between. In operation, the boost converter 102 can include a DC-to-DC power converter capable of stepping up voltage (while stepping down current) from its input (supply) to its output (load). To accomplish this, the boost converter 102 may include any desired one or more active components. For example, in one embodiment, such active component(s) may include one or more switches and one or more diodes of any desired type.

The power inverter (inverter) 104 is in electrical communication with the boost converter 102 to generate an output voltage. The power inverter 104 is an electronic device or circuitry that changes DC to AC. The power inverter 104 can produce a square wave, modified sine wave, pulsed sine wave, pulse width modulated wave (PWM) or sine wave depending on circuit design.

The inverter circuit 100 also includes a bypass circuit 106. The bypass circuit 106 may include one or more switches and/or one or more diodes of any desired type. Switch includes but not limited to transistor, or other power semiconductor switch. Descriptions of various switches and related operation principles of the switches for providing multilevel inverter device are described in U.S. Pat. No. 9,413,268 entitled "Multilevel Inverter Device and Method" by Dianbo Fu, et al., filed on May 10, 2012, which is herein incorporated by reference in its entirety for all purposes.

The bypass circuit 106 is coupled between the power source 108 and the power inverter 104 as illustrated by FIG. 1. On the one hand, when the output voltage is smaller than a threshold voltage, the source power is transmitted directly from the power source 108 to the power inverter 104 via the bypass circuit 106. In one embodiment, during an output cycle period, anytime when the output voltage is smaller than a threshold voltage, the source power is transmitted directly from the power source 108 to the power inverter 104 via the bypass circuit 106. The input voltage of the power inverter 104 directly comes from (or is directly powered by) the power source 108. The boost converter 102 is bypassed and not activated. The output voltage is powered by the power source directly via the bypass circuit without activating the boost converter. On the other hand, when the output voltage is larger than the threshold voltage, the source power is boosted by the boost converter 102 which is activated, and then the boosted voltage goes through the power inverter 104. The output voltage is powered by the power source boosted by the boost converter. In some embodiments, the threshold voltage may correspond to a half of an input source voltage of the power source.

In an example, the boosted voltage may directly pass through (or be directly applied to) the power inverter 104 without passing through the bypass circuit 106. In another example, the boosted voltage may go through the power inverter 104 via a switch of the bypass circuit 106. The input voltage of the power inverter 104 comes from the boost converter 102. Only in this situation, the input power source 108 passes through both the boost converter 102 and the power inverter 104. When an output voltage equals to a threshold voltage, the source power may not be boosted by the boost converter 102. The threshold voltage may vary depending on different design needs and applications. The detailed schematic diagrams will be described below with respect to the following drawings.

The inverter circuit 100 also includes a load 110 which represents the power consumed by a circuit coupled to the power inverter 104.

Advantageously, the inverter circuit 100 is capable of achieving high efficiency as well as tight regulation. When an output voltage is smaller than a threshold voltage, the source power is transmitted directly from the power source 108 to the power inverter 104 via the bypass circuit 106, without going through the boost converter 102. Thus, the inverter circuit 100 may achieve a better efficiency in comparison with conventional power converters which might require that the boost converter 102 remain active most of the time. Furthermore, the boost converter 102 may be implemented as an unregulated LLC resonant converter operating at a fixed switching (e.g., the resonant frequency of the LLC resonant converter). As a result, the LLC resonant converter may achieve high efficiency through zero voltage switching of primary switches, zero voltage switching of secondary switches, and/or zero current switching of the secondary switches. Moreover, the inverter circuit 100 is tightly regulated through adjusting the output voltage of the power inverter 104.

Figure 2:
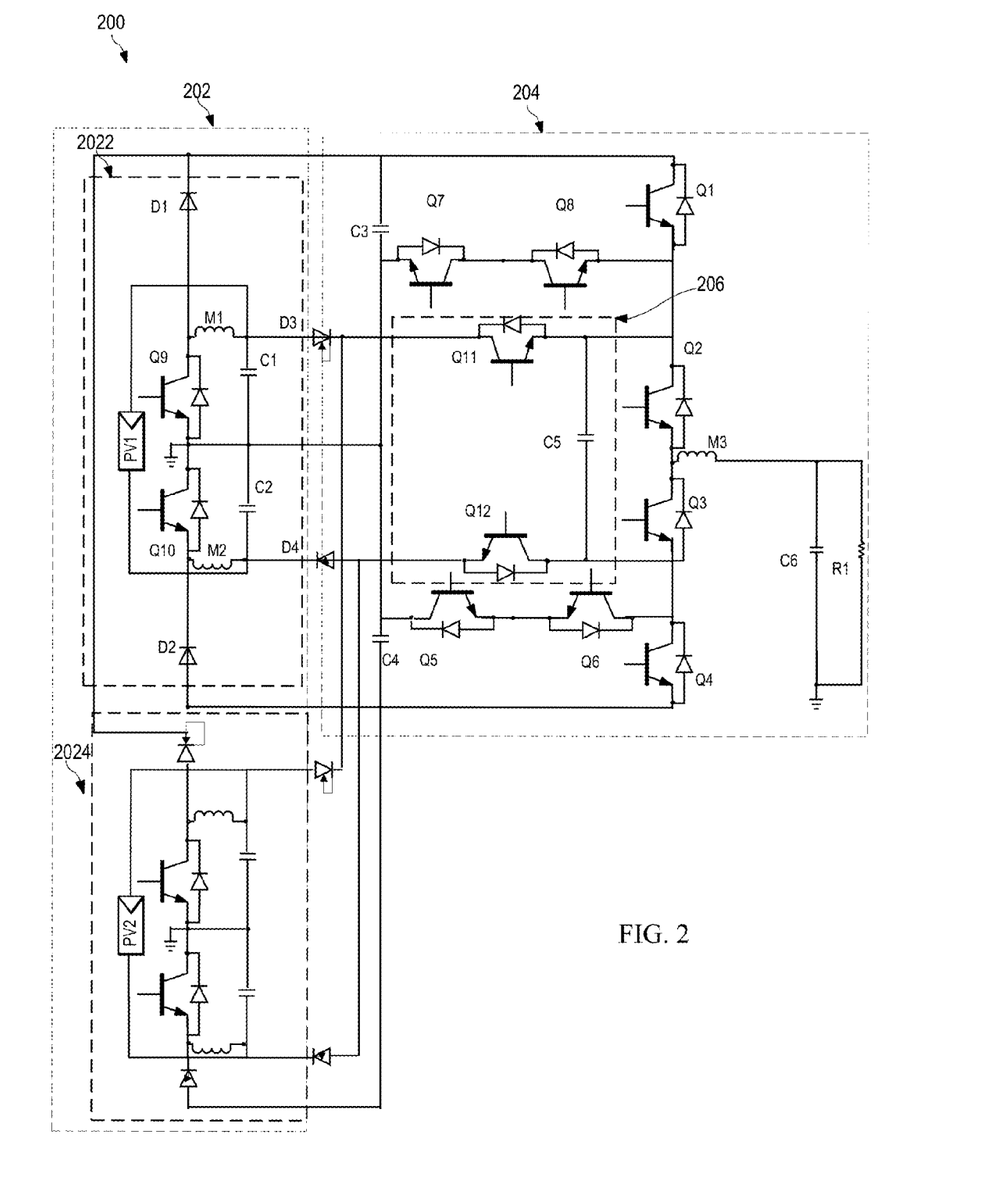
FIG. 2 illustrates an inverter apparatus for converting direct current to alternating current, in accordance with another embodiment.

FIG. 2 illustrates a schematic diagram of the inverter circuit 100 shown in FIG. 1 in accordance with various embodiments of the present disclosure.

As shown, the inverter circuit 200 includes a power source PV1 and a power source PV2. One terminal of the power source PV1 is electrically coupled to a first capacitor C1 that spans to ground. Further, the other terminal of the power source PV1 is electrically coupled to a second capacitor C2 that also spans to ground.

As further shown, the inverter circuit 200 includes a boost converter 202. The boost converter 202 includes a first converter 2022 and a second converter 2024. The first converter 2022 includes switches, such as switch Q9 and switch Q10. An emitter of switch Q9 is electrically coupled to ground, and a collector of switch Q10 is electrically coupled to ground. A collector of switch Q9 is electrically coupled to the capacitor C1 and to anode of a diode D3 via a motor (or inductor) M1, respectively. An emitter of switch Q10 is electrically coupled to capacitor C2 and to cathode of a diode D4 via a motor (or inductor) M2, respectively. The collector of switch Q9 is electrically coupled to anode of a diode D1. The emitter of switch Q10 is electrically coupled to cathode of a diode D2. The second converter 2024 has similar or substantially identical circuit structure as the first converter 2022. A circuit structure can include a set of circuit components (or types of circuit components) and a connection topology or connection relationship among the circuit components for performing an operation. Similar circuit structures may have substantially identical connection topologies and/or types of components capable of performing the same operation or function.

With continuing reference to FIG. 2, the inverter circuit 200 further includes a power inverter 204. As shown, the power inverter 204 includes switches Q1-Q4. An emitter of switch Q2 is electrically coupled to a terminal of a motor (or inductor) M3. Such motor M3, in turn, includes another terminal that is electrically coupled to ground via a parallel-coupled capacitor C6 and resistor R1, for filtering purposes. A collector of switch Q3 is electrically coupled to the terminal of motor M3. A collector of switch Q2 is electrically coupled to an emitter of switch Q1. A collector of switch Q1 is electrically coupled to a cathode of the diode D1. An emitter of switch Q3 is electrically coupled to a collector of switch Q4. An emitter of switch Q4 is electrically coupled to an anode of the diode D2.

The power inverter 204 may optionally include switches Q5-Q8. An emitter of switch Q7 is electrically coupled to a collector of switch Q1 via a capacitor C3. A collector of switch Q7 is electrically coupled to a collector of switch Q8. An emitter of switch Q8 is electrically coupled to an emitter of switch Q1. An emitter of switch Q5 is electrically coupled to an emitter of switch Q6. A collector of switch Q6 is electrically coupled to an emitter of switch Q3, and a collector of switch Q4.

Bypass circuit 206 is coupled between the power inverter 204 and the boost converter 202. For example, the bypass circuit 206 includes switches Q11 and Q12 as illustrated by FIG. 2. The bypass circuit 206 may be located inside the power inverter 204 or outside the power inverter 204. The bypass circuit is only an example here, not be construed as limiting in any manner. Because the bypass circuit 206 is used here, circuit 200 can be configured to allow the source power to be transmitted directly from the power source to the power inverter 204 via Q11 and Q12 when an output voltage is smaller than a threshold voltage. The input voltage of the power inverter 204 directly comes from the power source. No power goes through the boost converter 202. When the output voltage is larger than the threshold voltage, the source power is boosted by the boost converter 202, and then the boosted voltage goes through the power inverter 204. The input voltage of the power inverter 204 comes from the boost converter 202. Only in this situation, the input power source passes through both the boost converter 202 and the power inverter 204.

Figure 3:
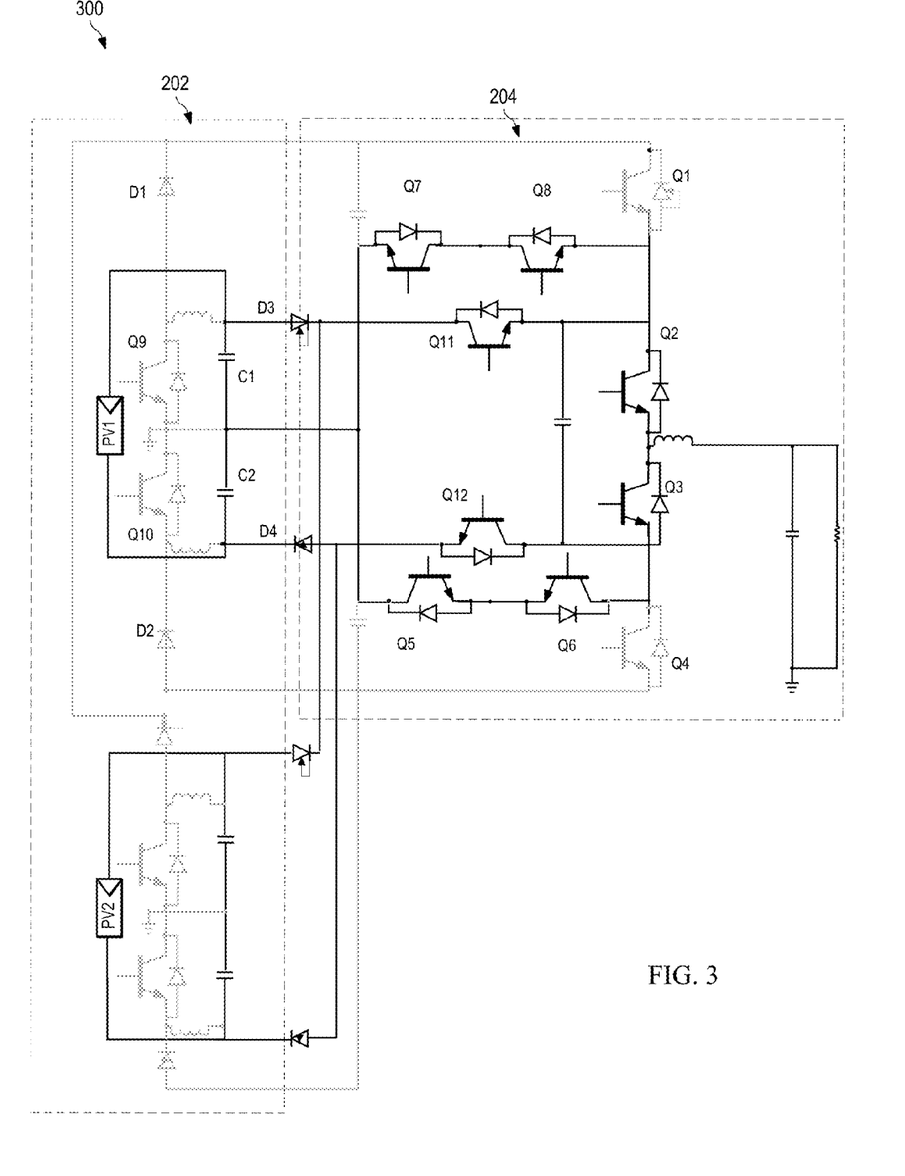
FIG. 3 illustrates an inverter apparatus for converting direct current to alternating current, in accordance with another embodiment.
Figure 4:
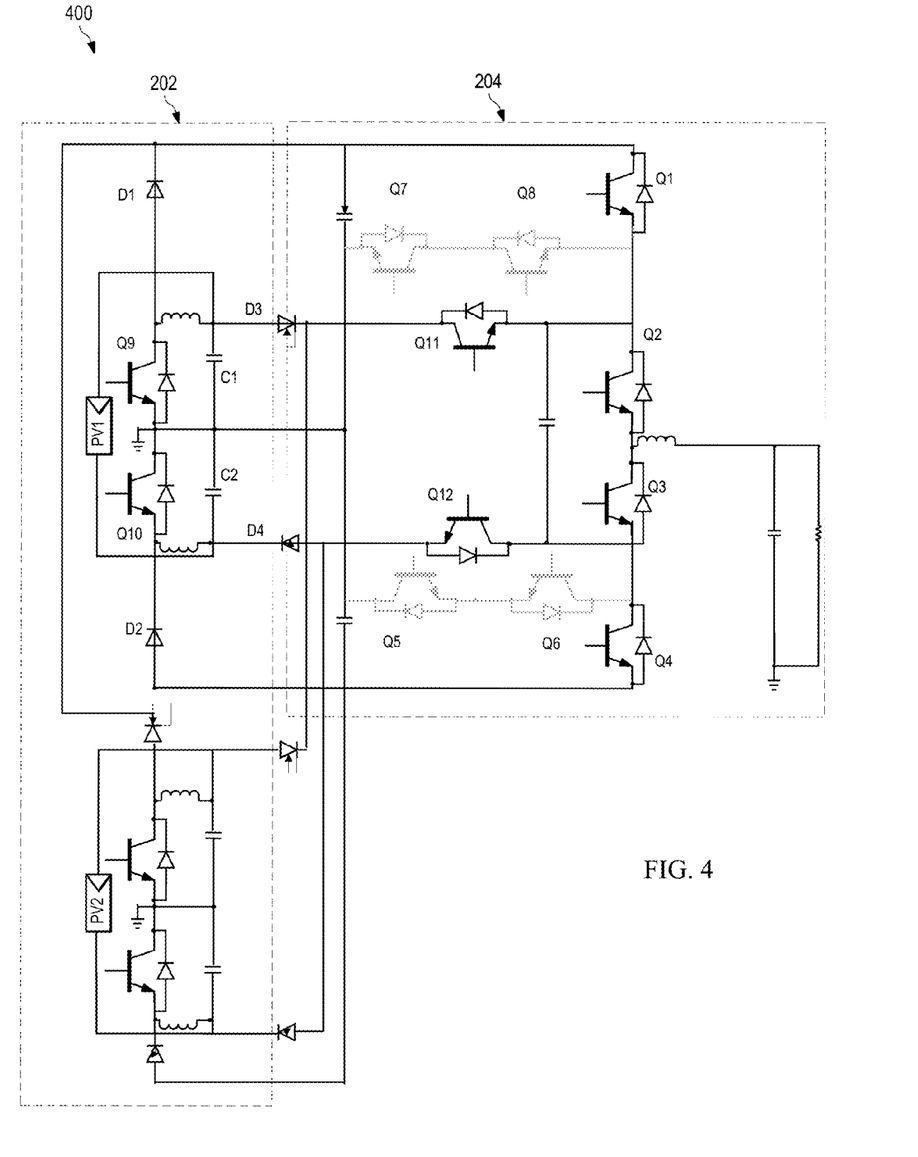
FIG. 4 illustrates an inverter apparatus for converting direct current to alternating current, in accordance with another embodiment.

FIG. 2 is a whole structure of the inverter apparatus. Some circuits in the inverter apparatus may be switched off or turned off at some situations, as shown in FIGS. 3 and 4. Circuit 200 in FIG. 2 can illustrate an example configuration when a half of an input source voltage is less than an output voltage. As shown, the source power is boosted by the boost converter 202, and then the boosted voltage goes through the power inverter 204.

In use, switches Q1-Q12 may be switched, under control of the base(s) thereof, at a user's requirements. Further, such switches may each include NPN bipolar junction transistors (BJT), each equipped with an anti-parallel diode, in the manner shown. In other embodiments, different types of switches and configurations may be employed, as desired. For example, ion BJT may be employed in another embodiment.

To this end, the type, quality, and associated cost of switches Q1-Q12 may be chosen to take advantage of available cost-savings in view of the lower associated usage frequency or modulation frequency. Further, as shown, the booster converter 202 and the power inverter 204 may be configured to utilize a minimal number of components (e.g. two transistors/sub-circuits, etc.) to incur further cost-savings.

FIG. 3 illustrates an example when a half of an input source voltage is larger than or equals to an output voltage. In this situation, the source power is transmitted directly from PV panel to the power inverter 204 via switches Q11 and Q12, thus the boost converter 202 is bypassed (and not activated). Switches Q9 and Q10 of the boost converter 202 are turned off. Switches Q1 and Q4 of the power inverter 204 are also turned off. It means switches Q1 and Q4 do not need to work at this scenario. As a result, high efficiency is achieved by bypassing the boost converter 202. FIG. 3 may also be called as a boost bypass mode.

FIG. 4 illustrates another example when a half of an input source voltage is less than an output voltage. In this situation, the source power is boosted by the boost converter 202, and then the boosted voltage goes through the power inverter 204. In this mode, the input power source can also deliver power to the mode. Hence, the boost circuit only operates in a non-freewheeling mode. FIG. 4 may also be called as a partial boost transfer mode. Description of freewheeling devices and operations can be found in related U.S. Pat. No. 9,413,268 entitled "Multilevel Inverter Device and Method" by Dianbo Fu, et al., filed on May 10, 2012.

As illustrated in FIG. 4, switches Q5-Q8 may work or not. Assume switches Q5-Q8 are turned off. It means that switches Q5-Q8 do not need to work. Higher efficiency can be achieved. The output of the boost converter 202 in FIG. 4 will be different from that in FIGS. 1, and 3.

Figure 5:
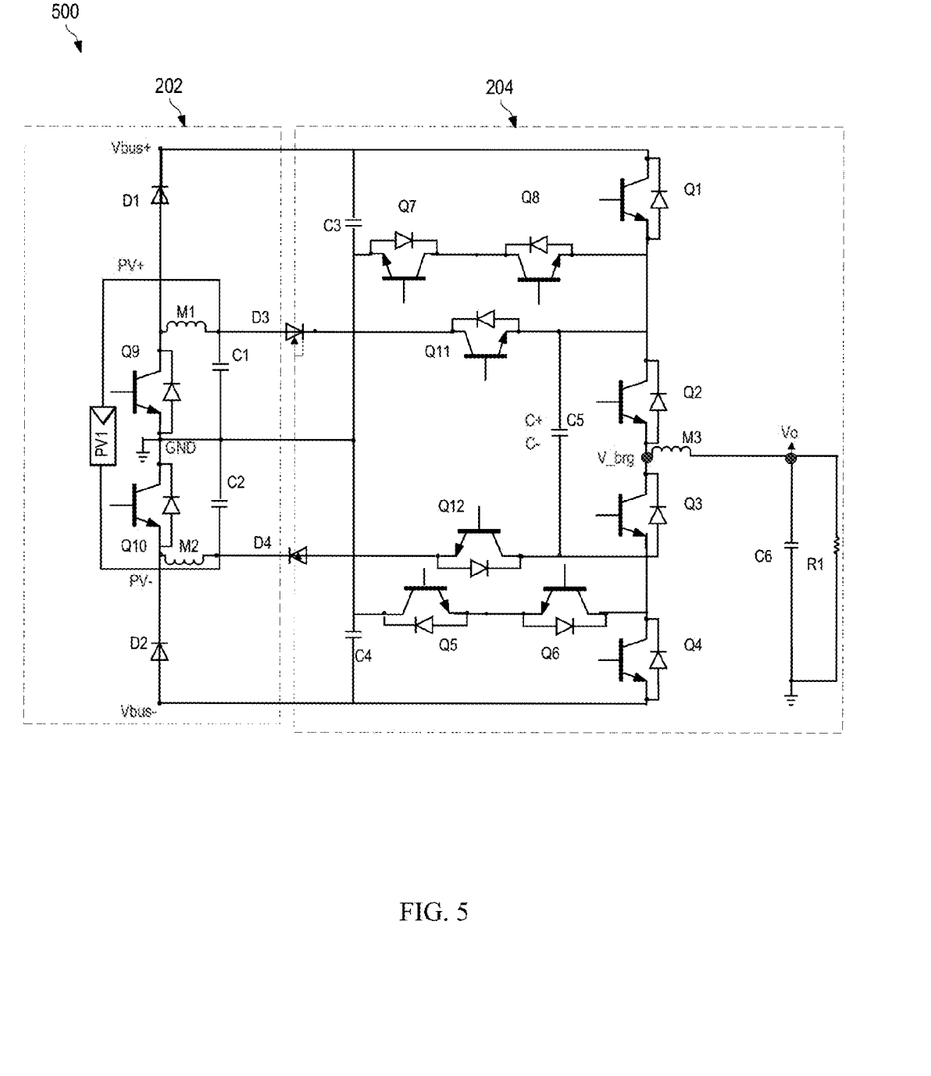
FIG. 5 illustrates 7-level output in accordance with an embodiment.
Figure 6A:
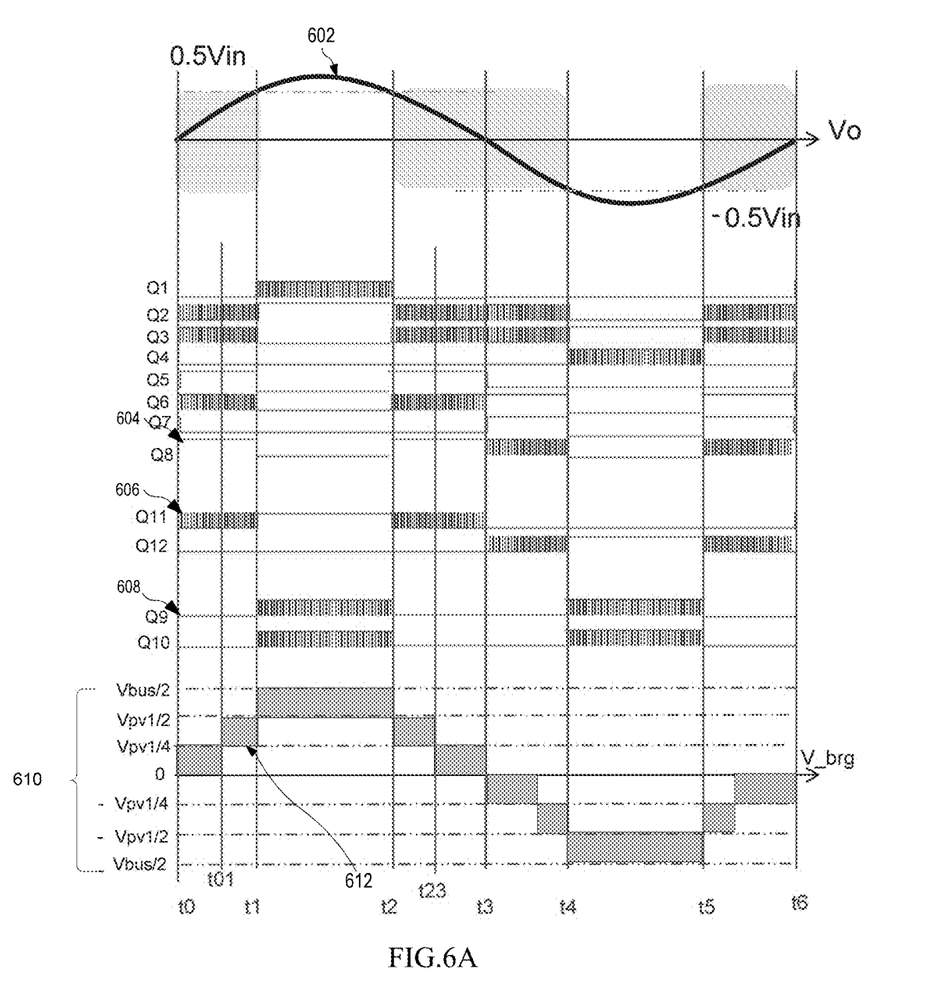
FIG. 6A illustrates a timing diagram of various signals in a 7-level inverter apparatus, in accordance with an embodiment.
Figure 6B:
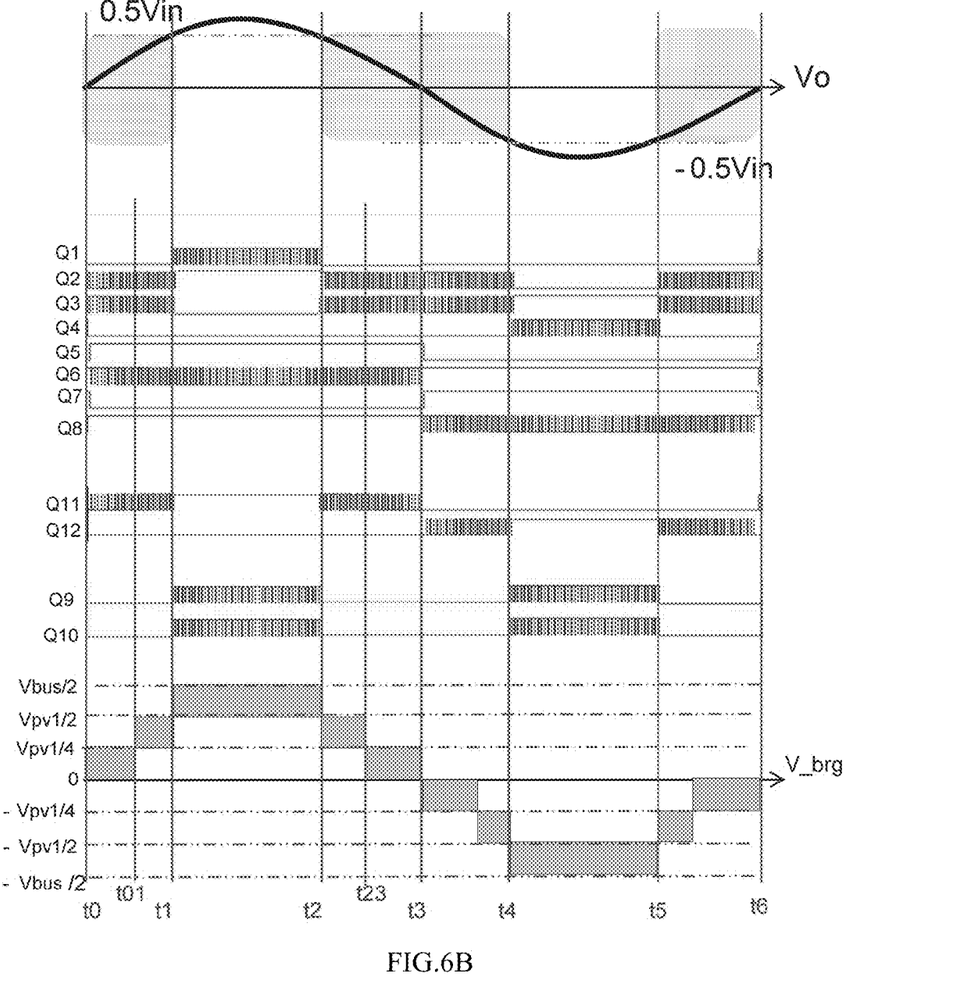
FIG. 6B illustrates a timing diagram of various signals in a 7-level inverter apparatus, in accordance with another embodiment.

A Conventional inverter may operate as a 5-level inverter. With the proposed circuit, the inverter output can exhibit a 7-level voltage variation as shown at FIG. 5, which leads to smaller output filter than conventional ones. Still yet, because less power is processed by boost converter, less loss, volume, cost could be achieved. Of course, any replication and associated expense may be expended on any elements, as desired and for any reason, without departing from the spirit of various embodiments disclosed herein. FIGS. 6A, 6B show an exemplary 7-level outputs of inverter 500 as Vpv1/4+, Vpv1/4−, Vpv1/2+, Vpv1/2−, Vbus/2+, Vbus/2−, and 0. Vpv1/4+, Vpv1/4−, Vpv1/2+, Vpv1/2−, Vbus/2+, Vbus/2−, and 0. These levels are used as an example to explain the 7-level output but not to limit the output voltage to the 7-level. The output voltage may be different from Vpv1/4+, Vpv1/4−, Vpv1/2+, Vpv1/2−, Vbus/2+, Vbus/2−, and 0.

The detailed information for the 7-level output is illustrated in FIGS. 6A and 6B. FIG. 6A illustrates a timing diagram of various signals in the 7-level inverter apparatus shown in FIGS. 1-4, according to an exemplary embodiment. Vo 602 is the voltage waveform at the output of the apparatus. As shown in FIG. 6A, Vo 602 corresponds to a sinusoidal waveform filtered from the 7-level PWM voltage V_brg output 610 of the inverter apparatus. Vbus/2, Vpv1/2, Vpv1/4, 0, −Vpv1/4, −Vpv1/2 and −Vbus/2 may indicate levels of output voltage (e.g. V_brg), for example, of circuit 500 of FIG. 5.

Turning now to FIG. 6A, during the time interval from t0 to t1, inverter 500 can be configured to transmit the source power directly from the power source to the power inverter via the bypass circuit. For example, the power source is transmitted via either switch Q11 or Q12 of the bypass circuit. Switches Q9 and Q10 of the boost converter do not need to work so they are turned off (or switched off) as shown by 608 of FIG. 6A. Thus, the boost converter 202 is bypassed and the cost of operating the boost converter can be saved. Switches Q1 and Q4 are also turned off. Switches Q2 and Q3 are complementary switching and performing PWM. Switches Q5 and Q8 are turned on (or switched on), e.g. with time varying duty cycles, as shown by 604 of FIG. 6A, and switch Q7 is turned off (or switched off). During t0-t1, Switches Q6 and Q11 are complementary switching and performing PWM, e.g. with varying duty cycles, as shown by 606 of FIG. 6A. A PWM waveform can be generated at Vo. As a result of such a configuration, half of the input source voltage (0.5 Vin, PV1/2 or Vpv1/2) is larger than output voltage Vo during t0 to t1.

Capacitor C5 may be configured as a flying capacitor to be charged/discharged to achieve desired results. Descriptions of detailed configurations and operations using a flying capacitor for an inverter can be found in a related US Application Publication No. 2016/0268924, filed on Mar. 12, 2015, entitled "Multi-Level Inverter Apparatus and Method", by Dianbo Fu et al., which is herein incorporated by reference in its entirety for all purposes. Configurations of PWMs (e.g. including time varying duty cycles) for turning switches Q2 and Q11 on/off may vary at different points in time. For example, during t0 to t01, switches Q2 and Q11 are not switched on simultaneously (i.e. both are not in an on state at the same time) so that the output voltage is switch between 0 and Vpv1/4. During t01 to t1, switches Q2 and Q11 are not switched off simultaneously (i.e. both are not in an off state at the same time) so that the output voltage is switch between Vpv1/4 and Vpv1/2 as shown by 612 of FIG. 6A.

During the time interval from t1 to t2, half of an input source voltage (0.5 Vin or 0.5 Vpv1) is less than an output voltage (i.e., 0.5 Vin<Vo), the boost converter 202, which includes switches Q9 and Q10, is boosted. Switches Q9 and Q10 are performing PWM. Switch Q11 is turned on, and switch Q12 is turned off. In order to achieve high efficiency, switches Q5-Q8 are turned off in this example. Switch Q2 is turned on and switch Q3 is turned off. Switch Q1 is performing PWM. A PWM waveform can be generated at Vo. A second DC voltage source Vbus may be provided. In one embodiment, voltage sources Vpv1 and Vbus may be sized to generate V_brg maintained withint Vbus/2 and Vpv1/2 during the time interval from t1 to t2 based on the configuration of inverter 500.

During the time interval from t2 to t3, half of the input source voltage (0.5 Vin) is larger than the output voltage (i.e., 0.5 Vin>Vo), the source power can be transmitted directly from the power source to the power inverter via the bypass circuit. The power source is transmitted via either switch Q11 or Q12 of the bypass circuit. Switches Q9 and Q10 of the boost converter do not need to work so they are turned off (or switched off). Thus, the boost converter 202 is bypassed. Switches Q1 and Q4 are also turned off. Switches Q2 and Q3 are complementary switching and performing PWM. Switches Q5 and Q8 are turned on (or switched on), and switch Q7 is turned off. Switches Q6 and Q11 are performing PWM. A PWM waveform can be generated at Vo. During t2 to t23, switches Q2 and Q11 are not switched off simultaneously so that the output voltage is switch between Vpv1/4 and Vpv1/2. During t23 to t3, switches Q2 and Q11 are not switched on simultaneously so that the output voltage is switch between 0 and Vpv1/4.

During the time interval from t3 to t6, the output voltage is in negative half circle. Voltage waveform during t3-t4 is similar to waveform during t0-t1. Voltage waveform during t4-t5 is similar to waveform during t1-t2. Voltage waveform during t5-t6 is similar to waveform during t2-t3.

FIG. 6B illustrates a timing diagram of various signals in the 7-level inverter apparatus shown in FIGS. 1-4, according to another exemplary configuration. The timing diagram as shown in FIG. 6B is similar as that in FIG. 6A. Switches Q6 and Q1 are complementary switching and performing PWM during t1-t2 at FIG. 6B. Switches Q4 and Q8 are complementary switching and performing PWM during t4-t5 at FIG. 6B.

It should be noted that the timing diagram of the apparatus shown at FIG. 6A or 6B shows merely sample configurations/operations of an inverter. In fact, a controller (not shown) may be employed to turn on and off switches according to various configurations based upon the operation principles of boost dc/dc converters.

A method is provided for operating the inverter apparatus as illustrates by FIGS. 1-6B. When an output voltage is less than a voltage threshold, the boost converter and the bypass circuit are controlled to power an output voltage directly from the power source via the bypass circuit without activating the boost converter when the output voltage is less than a voltage threshold, and wherein two switches of the boost converter are switched off to deactivate the boost converter.

Figure 7:
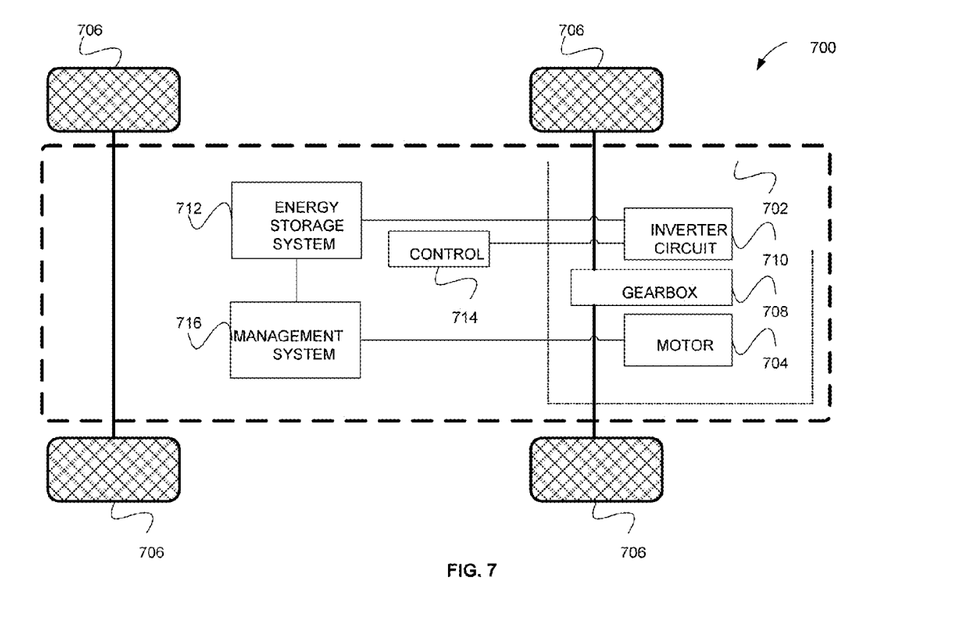
FIG. 7 illustrates a vehicle, in accordance with one embodiment.

FIG. 7 illustrates a vehicle 700, in accordance with one embodiment. In one optional embodiment, the vehicle 700 may be implemented utilizing one or more of the inverter circuits of FIGS. 1-5. However, it should be strongly noted that the current application of the inverter circuits of FIGS. 1-5 is set forth for illustrative purposes only and should not be construed as limiting in any manner.

In one embodiment, the vehicle 700 may include an electric vehicle. In other embodiments, the vehicle 700 may include a hybrid vehicle. Even still, other machines (e.g. trains, boats, airplanes, etc.) are contemplated, as well.

As shown, the vehicle 700 includes a drive system 702 with a motor 704 that drives a plurality of wheels 706 via a gearbox 708. The drive system 702 is further equipped with an inverter circuit 710 that converts direct current provided by an energy storage system 712 into alternating current usable by the motor 704, under the control of control circuitry 714. In various embodiments, the inverter circuit 710 may include one or more inverter circuit features described hereinabove. While the inverter circuit 710 is shown to be part of the drive system 702 and the control circuitry 714 is shown to be external to the drive system 702, it should be noted that such components (and any other components, for that matter) may be situated in any desired place and/or fashion (e.g. integrated or not, etc.).

Further, the control circuitry 714 may include passive power devices (e.g. transient filtering capacitors and/or inductors), active power devices (e.g. semiconductor and/or electromechanical switching devices, circuit protection devices, etc.), sensing devices (e.g. voltage, current, and/or power flow sensors, etc.), logic control devices, communication devices, converters for converting the energy supplied by the inverter circuit 710 to a suitable level for various vehicle systems (e.g. auxiliary systems, HVAC system, entertainment system, lighting, etc.), charging circuits, etc. Still yet, a management system 716 is shown to be provided and in communication with various components of the drive system 702. In use, the management system 716 may include various heating, cooling, and/or monitoring subsystems that, in turn, may be used to optimize battery performance and/or safety.

Figure 8:
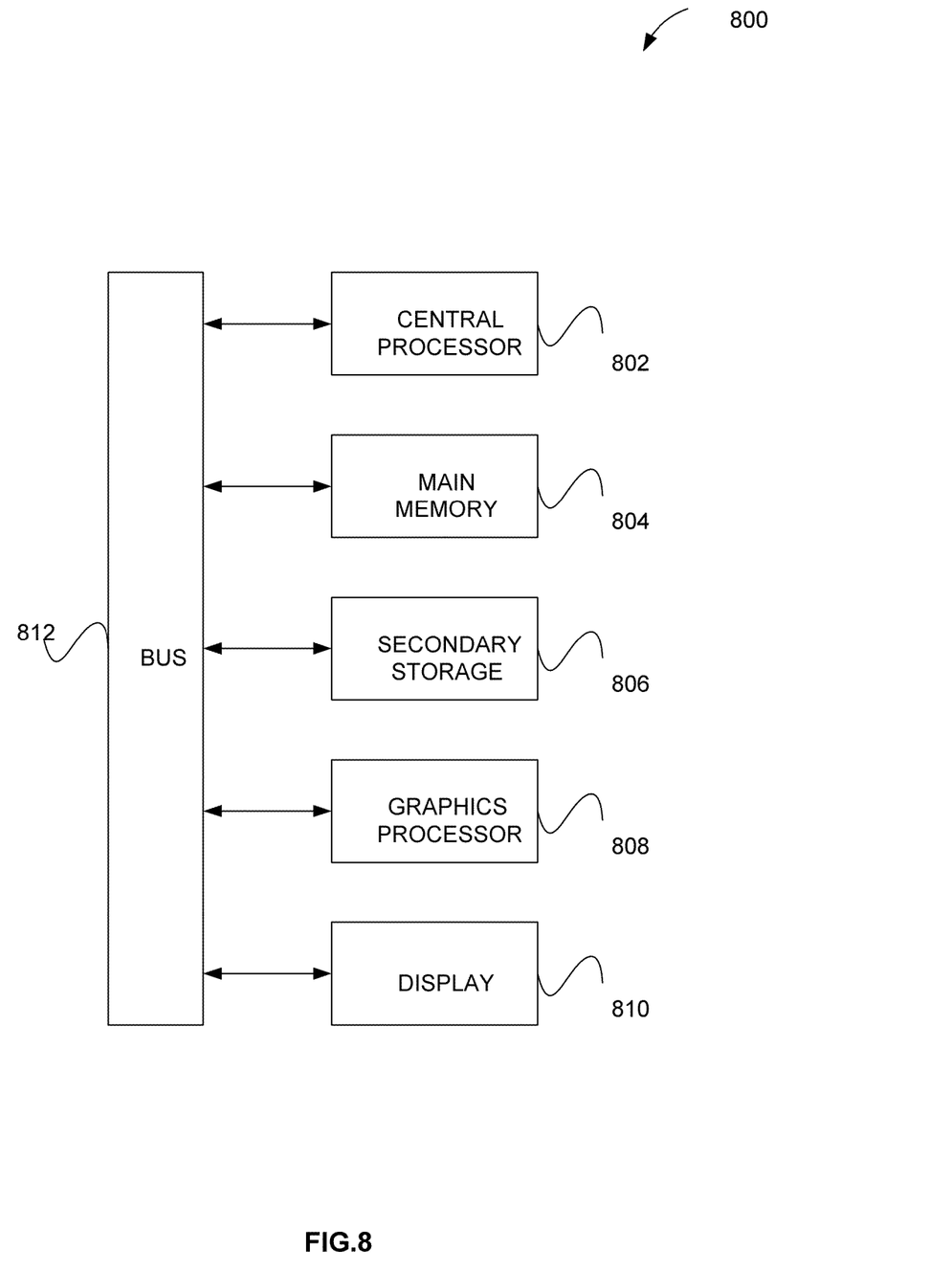
FIG. 8 illustrates an exemplary computer system, in accordance with one embodiment.

FIG. 8 illustrates an exemplary computer system 800, in accordance with one embodiment. As an option, the computer system 800 or any of the components thereof may be implemented utilizing one or more of the inverter circuits of FIGS. 1-4. However, it should be strongly noted that the current application of the inverter circuits of FIGS. 1-4 is set forth for illustrative purposes only and should not be construed as limiting in any manner.

As shown, the computer system 800 is provided including at least one central processor 801 which is connected to a bus 812. The computer system 800 also includes main memory 804 [e.g. hard disk drive, solid state drive, random access memory (RAM), etc.]. The computer system 800 also includes a graphics processor 808 and a display 810.

The system 800 may also include a secondary storage 806. The secondary storage 806 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 806, and/or any other memory, for that matter. Such computer programs, when executed, enable the computer system 800 to perform various functions (as set forth above, for example). Memory 804, secondary storage 806 and/or any other storage are examples of n computer-readable media.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g. a processor-based or processor-containing machine) and/or as specialized circuits or circuitry (e.g. discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g. "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus for converting a direct current to an alternating current, comprising:
   a boost converter coupled between a power source and a bypass circuit, and
   a power inverter coupled between the bypass circuit and a load to generate an output voltage, wherein two switches of the power inverter are connected in series with two switches of the bypass circuit, wherein the output voltage is powered by the power source directly via the bypass circuit without activating the boost converter when the output voltage is smaller than a threshold voltage, and wherein the output voltage is powered by the power source boosted by the boost converter when the output voltage is larger than the threshold voltage.

2. The apparatus of claim 1, wherein when a half of an input source voltage of the power source is larger than the output voltage, a switch of the bypass circuit is performing pulse-width modulation (PWM), and another switch of the bypass circuit is turned off.

3. The apparatus of claim 1, wherein when a half of an input source voltage of the power source is larger than the output voltage, the two switches of the power inverter are turned off.

4. The apparatus of claim 1, wherein when a half of an input source voltage of the power source is less than the output voltage, a switch of the bypass circuit is turned on, and another switch of the bypass circuit is turned off.

5. The apparatus of claim 1, wherein the power inverter comprises four switches, a first switch of the power inverter is connected in series with a second switch of the power inverter, the first switch and the second switch of the power inventor are connected in parallel with a first switch of the bypass circuit, and wherein a third switch of the power inverter is connected in series with a fourth switch of the power inverter, the third switch and the fourth switch of the power inventor are connected in parallel with a second switch of the bypass circuit.

6. The apparatus of claim 5, wherein when a half of an input source voltage is less than the output voltage, the four switches of the power inverter are turned off, the first switch of the bypass circuit is turned on, and the second switch of the bypass circuit is turned off.

7. The apparatus of claim 5, wherein when a half of an input source voltage is less than the output voltage, the first switch and the fourth switch of the power inverter are turned on, the second switch of the power inverter is performing PWM, the third switch of the power inverter is turned off, and wherein the first switch of the bypass circuit is turned on, the second switch of the bypass circuit is turned off.

8. The apparatus of claim 5, wherein when a half of an input source voltage is larger than the output voltage, the first switch and the fourth switch of the power inverter are turned on, the second switch of the power inverter and the first switch of the bypass circuit are performing PWM, and wherein the third switch of the power inverter and the second switch of the bypass circuit are turned off.

9. The apparatus of claim 1, wherein when a half of an input source voltage of the power source is larger than the output voltage, the two switches of the power inverter are turned off, and wherein a switch of the bypass circuit is performing PWM, and another switch of the bypass circuit is turned off.

10. The apparatus of claim 1, wherein when a half of an input source voltage of the power source is less than the output voltage, a switch of the power inverter is performing PWM, another switch of the power inverter is turned off, a switch of the bypass circuit is turned on, and another switch of bypass circuit is turned off.

11. The apparatus of claim 1, wherein the boost converter comprises a first converter and a second converter, each of the first converter and the second converter comprises two switches, and a circuit structure of the first converter is similar to that of the second converter.

12. The apparatus of claim 1, wherein the apparatus exhibits 7-level output.

13. The apparatus of claim 1, wherein the bypass circuit is located inside the power inverter.

14. The apparatus of claim 1, wherein the bypass circuit is located outside of the power inverter.

15. A method for operating an inverter apparatus, wherein the apparatus comprises a boost converter coupled between a power source and a bypass circuit, and a power inverter coupled between the bypass circuit and a load, the boost converter comprising two switches, wherein two switches of the power inverter are connected in series with two switches of the bypass circuit, wherein the method comprises;
   controlling the boost converter and the bypass circuit to power an output voltage directly from the power source via the bypass circuit without activating the boost converter when the output voltage is less than a voltage threshold, and wherein the two switches of the boost converter are switched off to deactivate the boost converter.

16. The method of claim 15, a switch of the bypass circuit is performing pulse-width modulation (PWM), and another switch of the bypass circuit is switched off.

17. The method of claim 15, wherein the method further comprises:
   switching off the two switches of the power inverter when a half of an input source voltage of the power source is larger than the output voltage.

18. The method of claim 15, wherein the power inverter comprises four switches, a first switch of the power inverter is connected in series with a second switch of the power inverter, the first switch and the second switch of the power inventor are connected in parallel with a first switch of the bypass circuit, and wherein a third switch of the power inverter is connected in series with a fourth switch of the power inverter, the third switch and the fourth switch of the power inventor are connected in parallel with a second switch of the bypass circuit, wherein the method further comprises:
   switching on the first switch and the fourth switch of the power controlling the second switch of the power inverter to perform PWM, and
   switching off the third switch of the power inverter.

19. The method of claim 15, wherein the method comprises:
   generating 7 voltage levels for the output voltage.

20. The method of claim 15, wherein the method further comprises:
   switching on a switch of the bypass circuit, and switching off another switch of the bypass circuit when a half of an input source voltage of the power source is less than the output voltage.

* * * * *